Nov. 10, 1931.                M. B. SKINNER                1,831,641
                                 PIPE CLAMP
                             Filed July 20, 1927
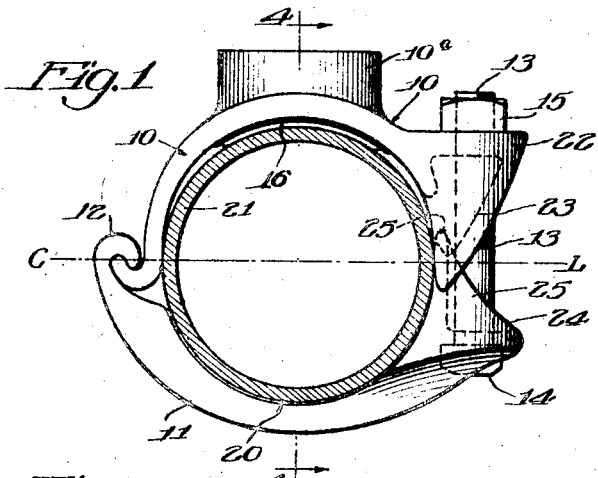
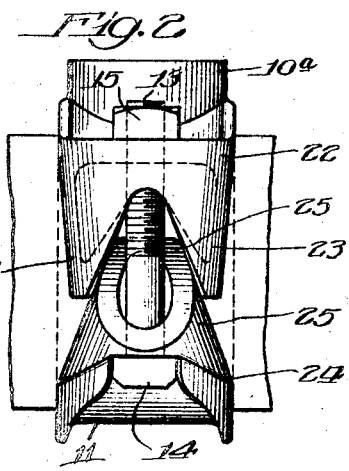
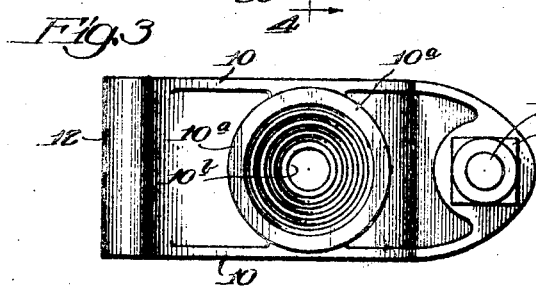
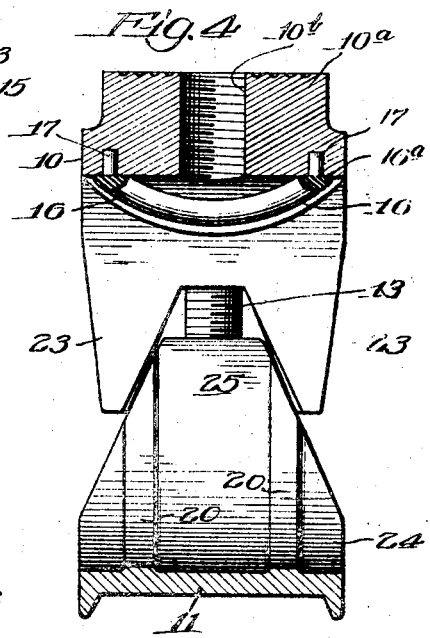
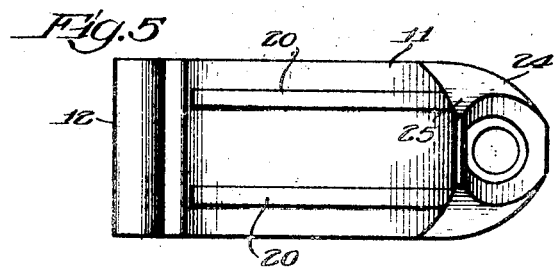
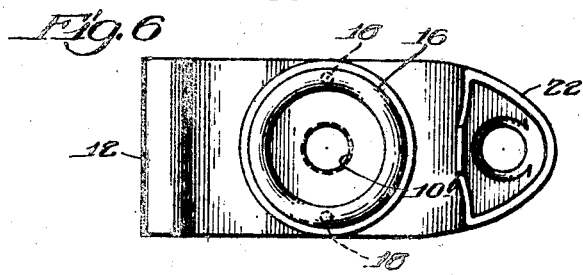
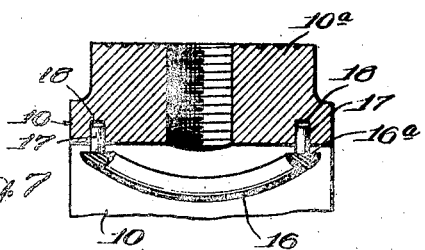

Patented Nov. 10, 1931

1,831,641

UNITED STATES PATENT OFFICE

MORTIMER B. SKINNER, OF WILMETTE, ILLINOIS, ASSIGNOR TO M. B. SKINNER CO., OF SOUTH BEND, INDIANA, A CORPORATION OF INDIANA

PIPE CLAMP

Application filed July 20, 1927. Serial No. 207,026.

These improvements relate to what are known broadly as pipe clamps. The particular one illustrated and described herein is called a branch pipe connection device, meaning a device used for connecting a branch pipe to what may be called a header or main.

The prime object of the invention is to obtain better and more satisfactory results through the avoidance or overcoming of certain defects and inefficiencies of prior devices of this general kind. One specific improvement is in the means for sealing the area where the branch pipe opening is made in the header or main. Another is in means for providing that the gasket-carrying member will maintain a substantially fixed relative position with respect to the pipe during the clamping operation—in other words, that it will not move while being clamped. Still another is in means providing a more direct pull by the bolt upon the clamping members. These three specific features coact to produce the desired result of a tight-fitting sealing clamp which may readily be applied for operations upon the main at a predetermined particular place, and which will maintain a tight joint indefinitely. Other objects and advantages will appear hereinafter.

In the accompanying drawings, which form a part hereof, Figure 1 is a side elevation of the improved clamp as applied to a header or main sectionally shown in cross view; Fig. 2 is what may be termed a front side elevation of the device complete; Fig. 3 is a top plan of the same; Fig. 4 is an enlarged medial vertical section through the body members, as on the line 4—4 of Fig. 1; Fig. 5 is a top view showing the inner surface of the lower clamping member on the scale of Fig. 3; Fig. 6 is a bottom view showing the inner surface of the upper clamping member; and Fig. 7 is an enlarged fragmentary section of a part of the structure of Fig. 4 with the sealing ring only partially positioned.

The device shown consists of an upper body member 10 having a boss 10a bored and screw-threaded at 10b, and a lower body member 11, these two members being substantially wide and formed to encompass and fit upon a substantially cylindrical pipe. There is a hinge-like readily-separable connection at one side of the device between the two members at 12 and a bolt 13 at the side opposite the hinge connection having a head 14 and a nut 15 and passing through extensions of the body members respectively for drawing the body members together. The structure as thus broadly described is well known in the art.

I provide a novel construction of packing ring or gasket marked 16 (Fig. 4) which is in the form of a ring and surrounds the threaded opening 10b in the boss 10a. It is old to provide a packing ring in some form around such opening 10b. The packing ring shown is substantially half round in cross-section and its inner surface at 16a (Fig. 7) fits face to face against the inner surface of the upper clamping member 10 (Fig. 4). This packing ring 16 is preferably made of lead or similar soft metal or alloy and is provided with a pair of integral studs 17 which fit snugly into holes 18 bored into the body member 10. These holes 18 are preferably a trifle shorter than the plugs or dowels 17 so that when the ring as a whole is forced, by means of a mandrel of the proper diameter tightly into its final position as shown by Fig. 4, the dowels 17 will be compressed and expanded so as tightly to fill the openings 18 respectively and thus hold the sealing ring tightly in place. The ring 16 may be cast in a mold. Its particular external configuration may vary. The rounded contour is advantageous in providing a narrow pipe contacting surface which readily conforms to the irregularities of the pipe to make a tight seal and at the same time there is provided a sufficient body of the soft metal for the desired strength. The ring so held is strongly interlocked with the body member, is easily applied and remains firmly in place.

Turning to the second feature of improvement, Fig. 5 shows a pair of ribs 20 extending from the front to the rear on the inner surface of the lower body member 11. Fig. 4 well shows these ribs to be slightly higher than the general inside surface of the lower body member, meaning that they extend inwardly from that general surface. Fig. 1 shows that the pipe 21 rests on these projections 20. These projections, which may be of various forms, provide a reduced and relatively small area for contacting the pipe, during the clamping operation. With such a reduced area a serious objection to prior practice is overcome in avoiding relative movement of the upper member with respect to the pipe when the bolt is tightened. I made the discovery that when the well known pipe clamp of this general type is tightened upon a pipe the upper member moves relative to the pipe owing to the fact that it has a soft and yielding gasket while the lower member contacts the pipe over so large an area that it remains substantially stationary. The condition should be exactly the reverse, and this is accomplished by these reduced surfaces or ribs. In other words, according to these improvements, when the two members are tightened upon the pipe the upper member remains stationary and the lower member adjust itself to the new relationships imposed by the tightening of the bolt, and by these means the desired result of a straight-inward pull upon the gasket is accomplished by a single bolt at one side of the device. These clamping members are usually made of malleable iron and there is a certain amount of spring and yield in the body metal, and this has cooperated in defeating the best results heretofore, notably in holding the lower member more tightly.

The third feature of improvement is in further means for providing a straight pull upon the body members by the bolt. Figs. 1 and 2 show that the upper member 10 has a bolt extension 22 provided with a bolt hole and on each side of the bolt a wing-like pipe-contacting part 23 the lower and free end of which extends beyond the place where contact is made, this place being on or near the center line C—L of Fig. 1. The lower body member has an extension 24 for the bolt, and has a tapering pipe-contacting part 25 extending upward between the jaws formed by the wings or extensions 23, with a little clearance between the upper and lower parts so that the proper clamping force may be applied to the gasket. Fig. 1 shows by dotted lines that the upper or free end of this extension 25 is beyond the place where the pipe is contacted, namely above the center line C—L. The pipe-contacting surfaces of these parts merge or extend into the free ends so as to avoid shoulders or corners at the places of contact. In the old practice there was a free space between the upper and lower extensions for the bolt. When the bolt was tightened and the metal was sprung the metal adjacent to the pipe at the extensions respectively would be caused to make contact as though to bite or dig into the pipe, getting tight at the sides and giving every evidence of a tight clamp before the gasket was compressed to the desired extent. Furthermore, through the springiness of the metal the extensions and adjacent parts would bend so that the body members as a whole were sprung and deformed, militating against the desired results. With such guiding and holding members at the side of the pipe as the projections 23 and 25 the extensions for the bolt are maintained in their proper relative shapes and relationships, and the projections 22 and 24 move toward each other in lines substantially parallel with the bolt and the body members are clamped upon the pipe without objectionable deformation and in the direct lines desired. By avoiding the biting-in action of the lower body member 11 it may adjust itself freely under the pulling strains by relative circumferential movement on the pipe.

The three features of improvement thus set forth and described coact with each other to produce greatly improved and beneficial results. Each one of these features would have advantage if separately embodied.

I contemplate as being included in these improvements all such variations, departures and changes from what is thus specificially illustrated and described as fall within the scope of the appended claims.

I claim:

1. In a pipe clamp of the character described, the combination of a pair of substantially wide body members defining a substantially cylindrical interior and formed to encompass a pipe, means for clamping the body members upon the pipe including a hinge-like connection at one side of the device and means for drawing the members together at the opposite side thereof, with rigid means overlapping each other carried by the body members respectively opposite the hinge-like connection and extending in opposite directions and substantially tangentially to the pipe at the side of the device for contacting the pipe at relatively small areas substantially at the center line of the pipe passing through the hingle-like connection for the purpose specified.

2. In a pipe clamp device of the character described, the combination of a pair of substantially wide body members defining a substantially cylindrical interior and formed to encompass a pipe, clamping means including a hinge-like connection at one side of the device and a bolt at the opposite side thereof for binding the members upon the pipe, each of said members having an extension to accomodate the bolt, each of said extensions having extending substantially tangentially to the pipe associated therewith a pipe-contacting part having a free end portion materially beyond the place where the part contacts the pipe normally clamped by the device, said pipe-contacting parts being substantially diametrically opposite said hinge-like connection and the pipe-contacting surfaces of said parts merging respectively into said end portions.

MORTIMER B. SKINNER.